(12) United States Patent
Brune et al.

(10) Patent No.: US 7,064,540 B2
(45) Date of Patent: Jun. 20, 2006

(54) CONVEYOR WITH A METAL DETECTING DEVICE

(75) Inventors: Markus Brune, Marienfeld (DE); Willi Behnke, Steinhagen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 3 days.

(21) Appl. No.: 10/964,515

(22) Filed: Oct. 13, 2004

(65) Prior Publication Data

US 2005/0083049 A1    Apr. 21, 2005

(30) Foreign Application Priority Data

Oct. 15, 2003   (DE) ................................. 103 48 659

(51) Int. Cl.
*G01N 27/72* (2006.01)
(52) U.S. Cl. .................... 324/232; 324/243; 56/10.2 J; 340/684
(58) Field of Classification Search ........... 324/207.15, 324/228, 232, 239–243, 262, 226, 225; 56/10.2 J, 56/DIG. 15; 340/684, 551
See application file for complete search history.

(56) References Cited

U.S. PATENT DOCUMENTS

| 5,600,941 | A | * | 2/1997 | Strosser | ..................... 56/10.2 J |
| 5,896,031 | A | * | 4/1999 | King | .......................... 324/225 |
| 6,252,397 | B1 | * | 6/2001 | Behnke et al. | .............. 324/232 |
| 6,637,179 | B1 | * | 10/2003 | Duncan | ..................... 56/10.2 J |

FOREIGN PATENT DOCUMENTS

DE        199 12 407 A1    9/2000

* cited by examiner

*Primary Examiner*—Jay Patidar
(74) *Attorney, Agent, or Firm*—Michael J. Striker

(57) ABSTRACT

A conveyor has a metal detecting device for detecting metal parts in a conveying product, a magnet arrangement for producing a measuring magnetic field through which the conveying product is movable, a sensor device for registration a change of the measuring magnetic field, a signal evaluating device for evaluating a signal outputted by the sensor device in case of a magnetic field change, to recognize a metal part in the conveying product, and an interference sensor device which in case of a registration of an interference event, which leads to a magnetic field change caused not by metal parts in the conveying product and registered by the sensing device, outputs a faulty triggering warning signal.

17 Claims, 5 Drawing Sheets

CONVEYOR WITH A METAL DETECTING DEVICE

BACKGROUND OF THE INVENTION

The present invention relates to a conveyor with a metal detecting device for detecting of metal parts in a product to be conveyed, in particular in a crop.

More particularly, it relates to a conveyor with a metal detecting device, which has a magnet arrangement for producing a measuring magnetic field, through which the product to be conveyed is moved, with a sensor arrangement which registers a change in the measuring magnetic field and a signal evaluating device, which evaluates a signal outputted in case of a magnetic field change by the sensing device for recognizing a metal part in a product to be conveyed. Moreover, the present invention relates to a harvester which has such a conveyor, as well as to a corresponding method for detecting metal parts in a product to be conveyed.

Conveyors of the above mentioned general type with metal detecting devices as a rule are used in harvesters, in particular in self-propelled harvesters, such as for example forage harvesters, to detect metal bodies which eventually are entrained with the crop in the machine, for example a turning tine, a pasture fence post, a can, or a needle and to automatically turn off the machines in this case. Thereby a situation is prevented when the metal parts can cause damages in the machine or later can be taken during feeding the crop to the animals and can lead to injuries or death of animals.

In a typical construction such a conveyor is composed of one or several feed roller pairs arranged one behind the other. Crop which comes from a harvesting attachment of the harvester is drawn between the rollers and further transported for example to a chopping drum or another working aggregate. The metal detecting device is located conventionally stationarily inside one of the front feed rollers. The detection region of the metal detecting device is formed by a measuring magnet field produced the magnetic arrangement. The measuring magnetic field is oriented preferably substantially vertically from below into the crop stream or often also inclinedly forwardly in direction of the harvesting attachment. The measuring magnetic field is selected with its intensity so that it penetrates at least a greater part of the crop layer. The magnet arrangement is composed mainly of a plurality of permanent magnets arranged transversely to the product flow direction.

When a metal part which is a ferromagnetic interfering element, reaches this detection region, the magnetic field is partially increased. This magnetic field change is registered by the sensing device. The sensing device conventionally has a plurality of sensor elements. As a rule, they are coils, in which a signal is induced in response to the change of the measuring magnetic field. Basically, also other magnetic field sensors, for example Hall sensors can be used as well. The signal outputted from the sensor device is supplied to a signal evaluation device which evaluates the signal to determine whether the magnetic field change was caused by a metal part in the product to be supplied. In the evaluating circuit the signal for example is amplified, and in some cases digitalized, filtered and set with a threshold value.

When the set threshold value is exceeded, an output signal is for example generated, which then is supplied to a fast stopping device for the whole machine or for the feeding aggregate, for example on the conveyor. Then in a very short time, before the metal part can reach a working aggregate located after the conveyor, for example in a forage harvester it is a chopping drum, the machine or the conveyor is stopped. When the machine is stopped, the operator of the conveyor must activate a throwing-out device and the crop is again thrown out and searched to remove the metal part. Thereby the damages for the subsequent working aggregates as well as a contamination of the crop by metal parts are efficiently prevented.

The mounting position of the metal detecting device causes however disturbances which can lead to a sfaulty release of the metal detection device. The metal detector is arranged inside the feeding roller protected from damages and wear, the however movable parts are located in the detection region which can lead to a change of the detection condition and to a faulty triggering. For example the outer surface of the feed roller is profiled and influences the magnetic field. Furthermore, for example the upper roller of the feed rollers is supported vertically movable and adapts its distance from the lower feed roller to the crop throughput. These movements also can lead to influencing the magnetic field. For reducing the structurally-dependent influences, non-ferromagnetic materials can be used in the detection region and the neighboring regions, such as VA steels or synthetic plastics. An example for this solution is disclosed in the German patent document DE 199 12 407 A1. Other influences which can lead to a faulty triggering of the metal detecting device include an external magnetic field, for example the earth magnetic field or magnetic fields of electric current cables laid in the ground.

When the harvesting operation is interrupted frequently by faulty triggering, this leads to increase of harvesting cost. In addition, correspondingly a correct triggering is faster recognized by operator erroneously as a faulty triggering and can lead to a new activation of the feeding without searching of the crop, that can lead to damages of the working aggregates. Excessively frequent fault triggerings finally lead to a decrease of reliability of the metal detecting device. The number of the faulty triggering can be reduced by an intelligent signal evaluation with signal filtering and so-called response-threshold. When however the response threshold of the metal detector is set very high to avoid a faulty triggering, there is a danger that metal parts are caught in the machine undetected. In particular, small metal parts which travel through the whole machine unobjectionably are not detected and contaminate the crop. Furthermore, the adjustment of the response threshold of the signal evaluation device of the metal detector represents always a compromise between possible faulty triggerings and possible damages to the machine or a contamination of the crop by non-detected metal parts.

SUMMARY OF THE INVENTION

Accordingly it is an object of the present invention to provide a conveyor and a method of the above mentioned general type, which reduce a number of faulty triggering without reducing reliability of detection.

In keeping with these objects and with others which will become apparent hereinafter, one feature of the present invention resides, briefly stated in a conveyor, comprising a metal detecting device for detecting metal parts in a conveying product; a magnet arrangement for producing a measuring magnetic field through which the conveying product is movable; a sensor device for registration a change of the measuring magnetic field; a signal evaluating device for evaluating a signal outputted by said sensor device in case of a magnetic field change, to recognize a metal part in the conveying product; and an interference sensor device which in case of a registration of an interference event, which leads to a magnetic field change caused not by metal parts in the conveying product and registered by said sensing device, outputs a faulty triggering warning signal.

In accordance with the present invention another feature of the present invention resides, briefly stated, in a method of detecting metal parts in a conveyed product, comprising the steps of moving the conveyed products through a measuring magnetic field, registering with a sensor arrangement a change of said measuring magnetic field; evaluating a signal outputted by the sensor arrangement in response to a magnetic field change for recognizing a metal part in the conveying product; detecting by an interference sensor device interference events which are caused not by metal parts in the conveying product and measured by the sensor device; and generating a faulty triggering warning signal in response to a registration of an interference event.

In accordance with the present invention, the conveyor is provided with an interference sensor device which, in case of registration of an interference event that leads to a magnetic field change caused not by metal parts in the product to be conveyed and registered by the sensor arrangement of the metal detecting device, outputs an error triggering warning signal. In other words the idea is to provide a timely recognition of an interference events by an additional interference sensor device, so that these interference events can be correspondingly taken into consideration.

The interference sensor device can be designed in different ways. It is however important that by this interference sensor device the interference events are measured as reliable as possible, so that it can lead finally to a registration of magnetic field changes on the sensor device of the metal detection device. In other words, both direct magnetic field changes can be measured, and also other events can be measured which indirectly lead to the situation that the sensor device "sees" the magnetic field changes.

In a preferable embodiment of the present invention, the interference sensor device is, for example, a magnetic field sensor. With this magnetic field sensor, magnetic changes are registered directly, or indirectly, that also can be measured in the sensor device of the magnetic detection device. The magnetic field sensor is formed and/or arranged so that it registers only such magnetic field changes which are caused not by metal parts in the product to be conveyed.

Preferably, the magnetic field sensor can be formed and/or arranged so that only changes of external magnetic fields, for example changes of the earth magnetic fields or magnetic fields caused by electric current conduits in the ground, are registered. This can be realized however in an arrangement, in which the field lines of the measuring magnetic field produced by the magnetic arrangement of the metal detecting device extend at a first side of the metal detecting device through the conveyed product. With a conventional arrangement of the metal detecting device in the lower front feed drum of a conveyor, it deals preferably with the upper side of the metal detecting device. The sensor arrangement of the metal detecting device is arranged then in this measuring magnetic field.

With the use of coils as sensor elements, they are arranged for example so that the field lines of the measuring magnetic field extend substantially through the coils. This can be provided for example by means of the pole shoes formed so that they pass inside the coils as well as by a suitable arrangement of the coils on the individual magnets of the magnet arrangement. The magnetic field interference sensing device is then arranged on a side facing away from the measuring magnetic field, for example the lower side of the metal detection device, and located thereby substantially outside of this measuring magnetic field or in other words in all cases in the edge region of the measuring magnetic field. The magnetic field sensor of the interference sensor device can be formed as a sensor having a similar or same construction as the sensor elements of the sensor arrangement of the metal detecting device.

With the passing arrangement it is guaranteed that the metal parts inside the crop which change the measuring magnetic field are registered by the sensor device of the metal detecting device. Since the magnetic field sensor of the interference sensor device is however located not inside the measuring magnetic field or in all cases located at the edge of the measuring magnetic field, these changes of the measuring magnetic field are not registered by the magnetic field sensor of the interference sensor device or registered with not required intensity. In this case the metal detecting device orderly sends a signal without outputting a faulty triggering warning signal by the interference sensor device. If however changes of external magnetic fields occur, for example when the harvester travels over an electric current cable line in the ground, this external magnetic field is superposed on the measuring magnetic field. Thereby the sensor device of the metal detecting device registers a magnetic field change. Simultaneously this external magnetic field is however registered by the magnet field sensor of the interference sensor device. In this case finally not only the sensor device of the metal detecting device outputs a signal, but also the interference sensor device outputs a faulty triggering warning signal. Thereby it is clear that with the triggering of the sensor device of the metal detecting device, a faulty triggering takes places.

In a very simple and cost-favorable realization of this embodiment, the metal detecting device has a metal wall located at a side of the magnet arrangement facing away from the passing product, which metal wall accumulates the magnetic field lines of the measuring magnetic field and supplies in direction of the magnet arrangement. Conventionally, in the metal detecting devices used in the harvesters a metal wall as a rule was located at the lower side and identified as a so-called "magnet trough". The magnetic field sensor of the interference sensor device is arranged at the side of this metal wall which faces away from the magnet arrangement, or in other words for example under the magnet trough.

In accordance with a further embodiment, the interference sensor device additionally or alternatively is provided with an acceleration sensor. Such an acceleration sensor serves for registration of acceleration forces occurring on the sensor device of the metal detecting device, as interference events. Such events can also lead to a magnetic field change on the sensor device. For example in the case of ground unevenness, for example during passage of potholes, the vehicle is shaken very intensely, and thereby because of the bearing clearances or connections of the feed housing, etc. changes of the magnetic fields occur. Also, it has to be taken into consideration that when such vibrations are registered, fast earth magnetic field changes can lead to faulty triggerings.

In accordance with an especially preferable embodiment, the interference sensor device has a plurality of sensors arranged in different positions along a direction extending transversely to the product flow direction. Identical of different sensor types can be utilized, for example two magnetic field sensors can be arranged on the axial ends of a feed roller, since in the vicinity of the roller flanges interferences occur especially frequently. Furthermore, for example in the central region of the feed roller, an acceleration sensor can be arranged. The signals of the different sensors of the interference sensor device can be correspondingly processed and in some cases output a faulty triggering warning signal.

The faulty triggering warning signal of the interference sensor device can be used in different ways. For example the faulty signal warning signal can be outputted to the signal evaluating device. The signal evaluating device can be formed so that with the use of the faulty triggering warning signal, a signal outputted by the sensor device of the metal detecting device can be detected. In particular, for example magnetic field changes which are not caused by interference metal can be counted out from the signal. Also, the metal detecting device in particular the signal evaluating device can be formed so that in the case of receiving a faulty triggering warning signal, the metal detecting device or the signal evaluating device can be completely temporarily deactivated, or also simply the sensitivity of the metal detecting device or the signal evaluating device can be temporarily reduced, for example by changing the response threshold. In a certain predetermined time interval then the metal detector can be again activated or set back to the normal sensitivity.

Furthermore, the faulty triggering warning signal can be outputted directly on the fast stopping device, so that there the fast stop in the case of receipt of a stop signal of the metal detecting device, which in a subsequent, certain short time period is introduced after the faulty triggering warning signal, is suppressed.

Alternatively or additionally, the faulty triggering warning signal can be outputted directly to the operator of the machine. This is provided in particular when an interference event is first registered after the faulty triggering and the time is no longer sufficient to suppress the faulty triggering for example in the signal evaluating device or in the fast stopping device. In this case the operator is informed that a faulty triggering takes place, so that without a long waiting time and without searching through the crop, it is possible to start again. For this purpose, the interference sensor device can be directly or indirectly, for example through a further control device and the like, connected with a signal outputting device in the driver's cabin, which can be provided by a part of a normal operator interface of the machine, for example a conventional display etc.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
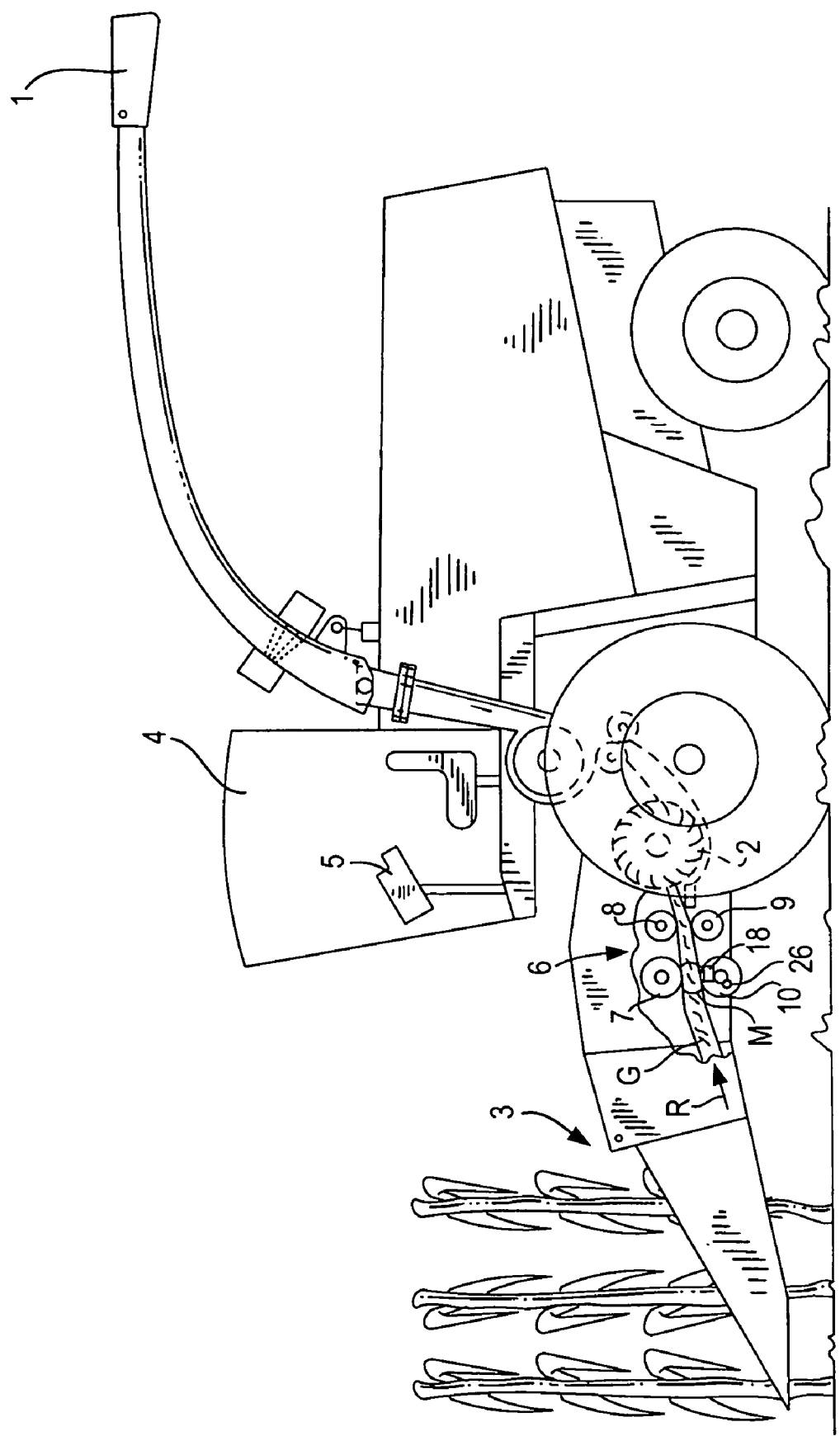
FIG. 1 is a view schematically showing a forage harvester with an embodiment of a conveyor in accordance with the present invention.

FIG. 1 shows schematically a harvester 1 formed as a typical forage harvester. In a traveling direction forwardly, a harvesting attachment 3 is arranged on the forage harvester and formed for example as a corn header for harvesting corn fields. A not shown cutter bar of the attachment 3 cuts the corn plants at a predetermined height over the ground and supply them into the machine 1.

Directly behind the harvesting attachment 3, a conveyor 6 is located in the forage harvester 1 and composed of two feed roller pairs 7, 8, 9, 10 which are arranged one behind the other in the conveying direction R. The both front feed rollers 7 and 10 serve for prepressing of the crop G. They are identified also as pre-pressing rollers 7, 10. The crop G is supplied then behind the second feed roller pair 8, 9, in direction of a chopping aggregate 2, in which the crop G is chopped and accelerated, and then after a post-acceleration is thrown upwardly through an upper discharge chute onto a trailer which is pulled by the harvester or onto a transporting vehicle which travels at its side.

In order to prevent that the metal parts are introduced with the crop in the machine and can lead to damages to the machine or contamination of the crop, a metal detecting device 18 is provided inside the conveyor 6, here in the front lower feed roller 10. When the metal detecting device 18 recognizes a metal part in the crop G, it produces a signal which leads to a stoppage of the machine.

Figure 2:
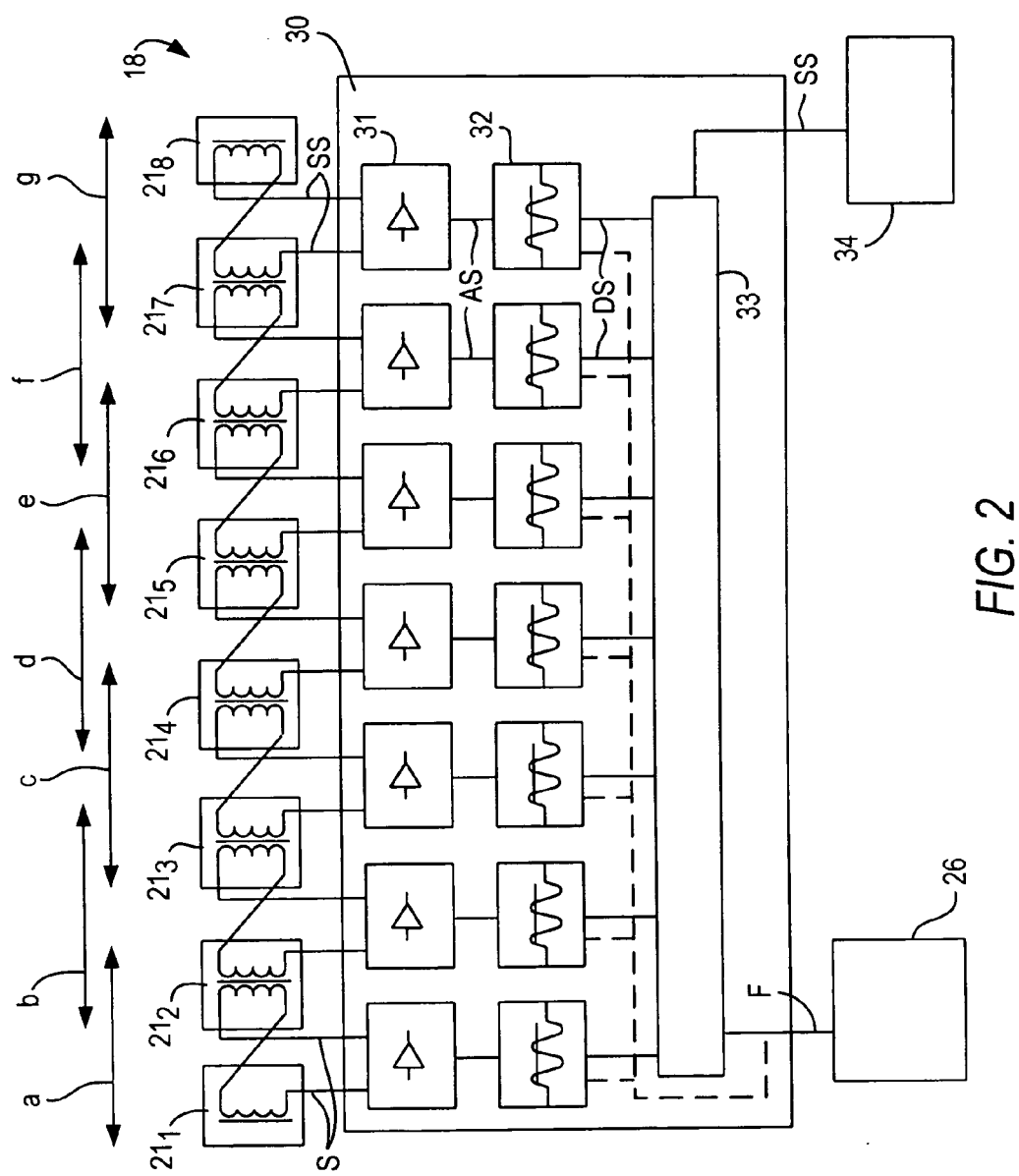
FIG. 2 is a view showing a block diagram for illustration of a sensor device and a signal evaluating device of a metal detecting device in accordance with the present invention.
Figure 3:
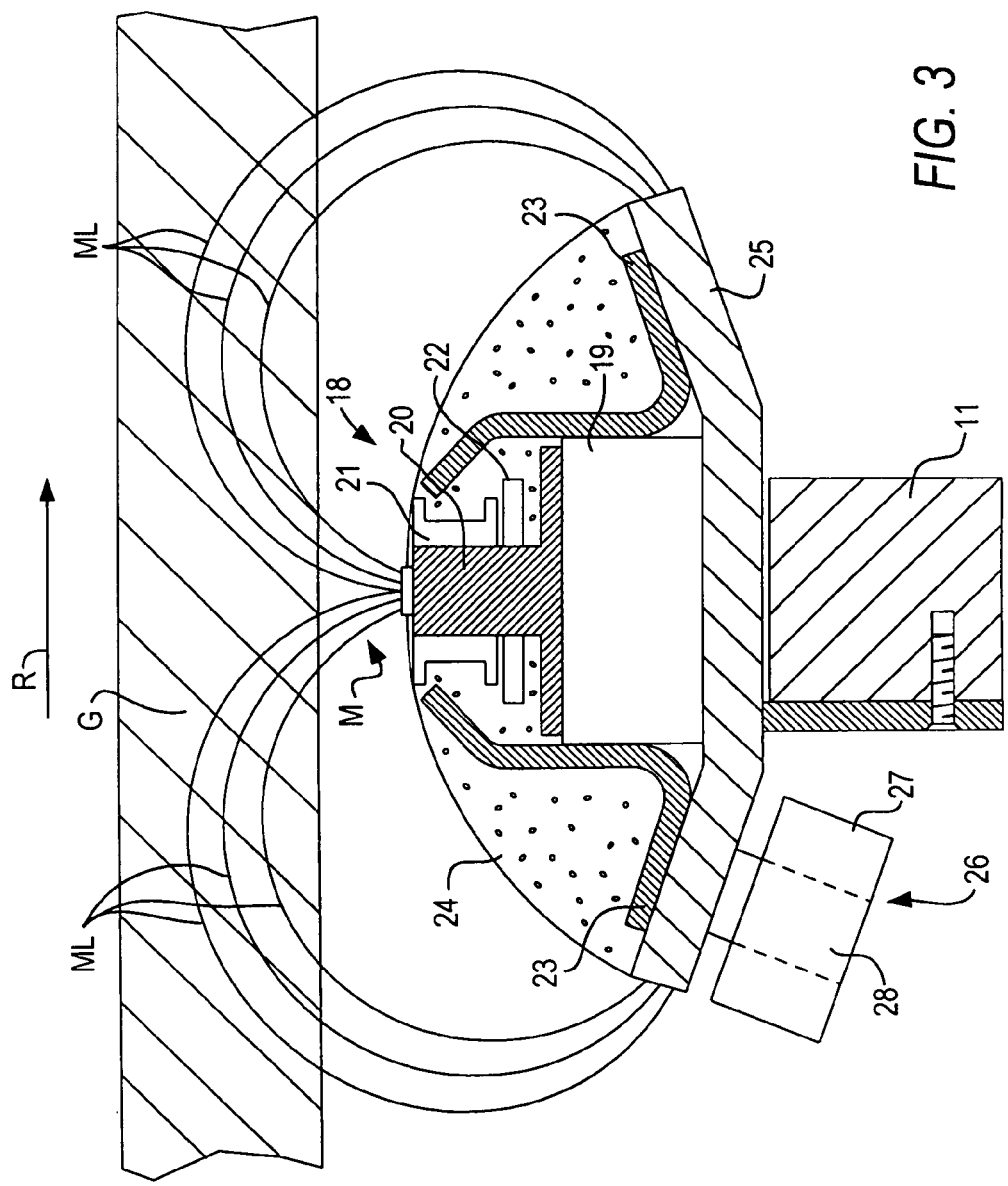
FIG. 3 is a view showing a cross-section through a metal detecting device with an additional interference sensor device in accordance with the present invention.
Figure 4:
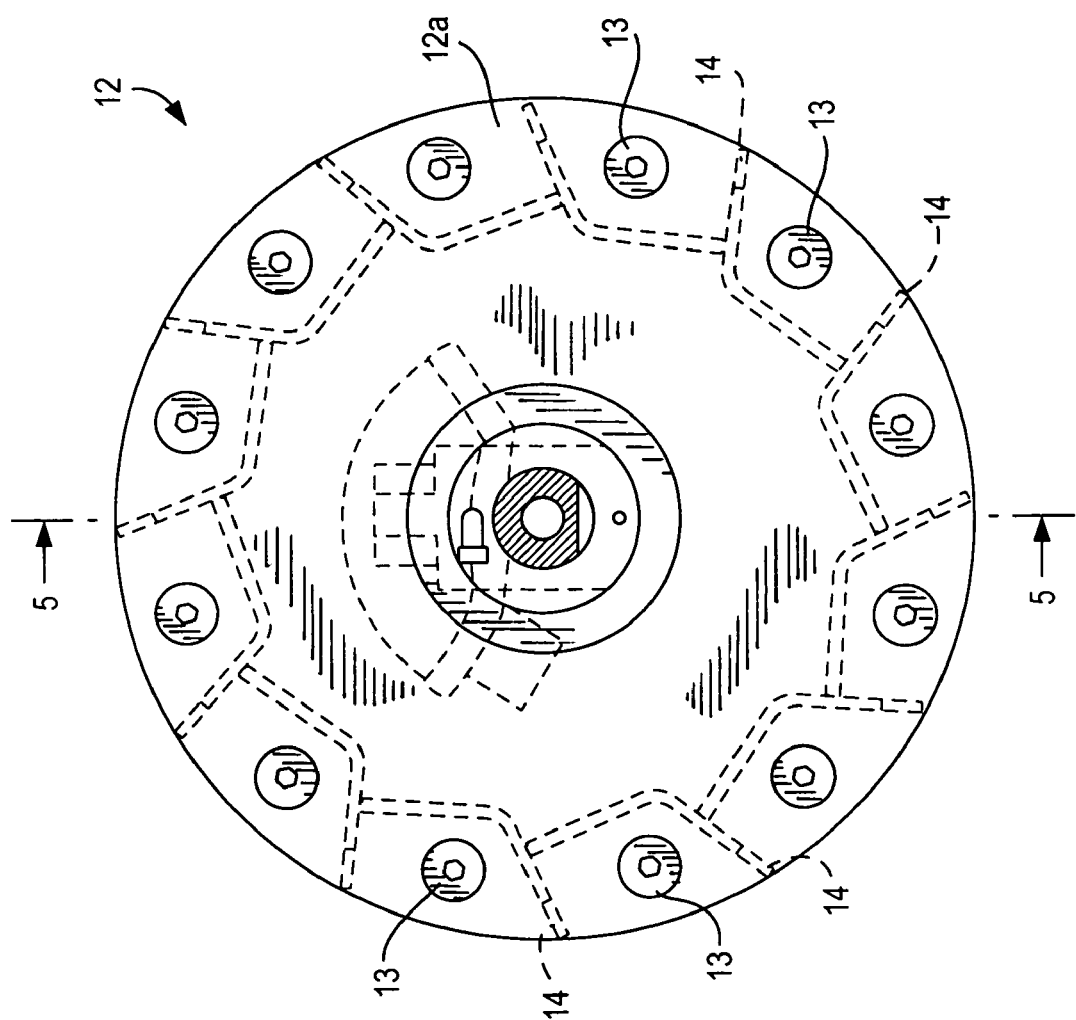
FIG. 4 is an axial plan view of a feed roller of a conveyor for illustration of the position of the metal detecting device of FIG. 3 in the conveyor in accordance with the present invention.
Figure 5:
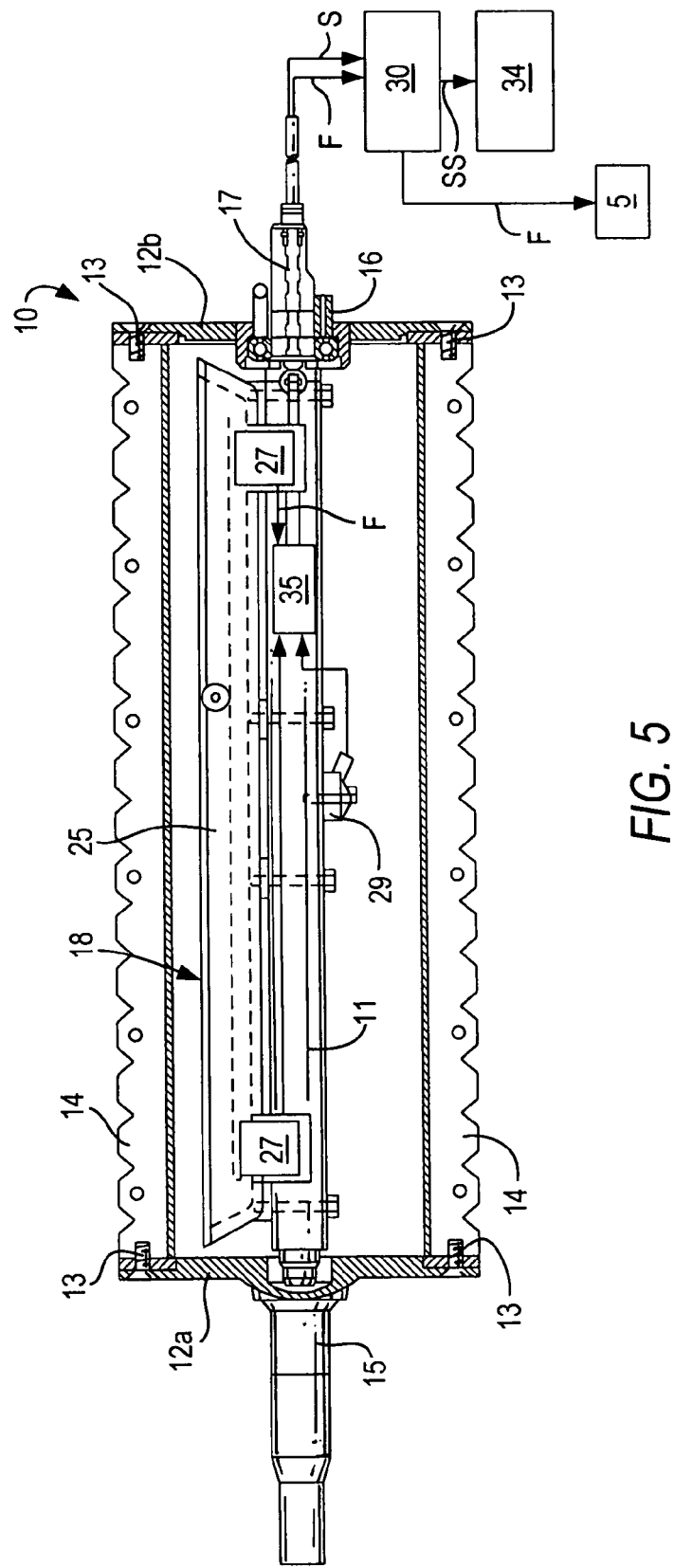
FIG. 5 is a longitudinal section through the feed roller of FIG. 4 taken along the line A–B.

The metal detecting device 18 operates with a measuring magnetic field M which is oriented upwardly in the crop stream shown in FIG. 3, so that the crop G passes through this measuring magnetic field M. Metallic elements lead to a change of the measuring magnetic field M, which is detected by the metal detecting device 18. A possible concrete construction of such a metal detecting device 18 is shown hereinbelow in FIGS. 2–5, while FIG. 3 shows a mechanical construction and FIG. 2 shows a circuitry. FIGS. 4 and 5 show an arrangement of this concrete construction in the feeding roller 10.

A core of the metal detecting device 18 is a magnet arrangement 19 composed of several individual magnets that are arranged one near the other in a row transversely to the conveying direction R of the crop G. It has a north pole N above and a south pole S below. Alternatively, instead of a plurality of individual permanent magnets, also a longitudinally extending, continuous magnet can be utilized. This magnet arrangement 19 is located on a metal wall 25, identified herein below as a magnet trough 24, extending also over the total width transversely to the conveying direction R of the crop G.

Several pole shoes 20 are located on the upper side of the magnet arrangement 19. Each of them has a lower wider portion laying on the north pole side of the magnet arrangement 19, and an upper smaller portion. The upper portions of the pole shoes 20 extend into individual coils $21_1, \ldots 21_8$ as shown in FIG. 2. The coils $21_1, \ldots, 21_8$ form the sensor arrangement 21, for registration of changes of the measuring magnetic field M. Total, there are eight individual pole shoes 20 with eight different coils $21_1, \ldots, 21_8$, which with their detection regions a, b, c, d, e, f, g cover the whole width transversely to the conveying direction R. This is schematically shown in FIG. 2. The eight coils $21_1, \ldots 21_8$ include double coils with two windings, wherein the first and last coils $21_1, \ldots 21_8$ each use however only one winding.

As shown in FIG. 3, the magnetic field lines ML magnetic L of the measuring magnetic field M extend from the north pole N on the magnet arrangement 19 through the individual pole shoes 20 and thereby through the coils $21_1, \ldots 21_8$ of the sensor device 21 upwardly through the crop G and back through the magnet trough 25 to the south pole S of the magnet arrangement 19. A change of the measuring magnetic field M by the metal parts in the crop G leads finally to the situation that in the coils $21_1, \ldots, 21_8$, in whose detection region a, b, c, d, e, f, g the measuring magnetic field change occurs, a current is induced which is picked up as a signal A and can be evaluated.

It is believed to be clear that in the magnet arrangement 19, the pole shoes 20, the coils $21_1, \ldots, 21_8$ of the sensor device 21 and the magnet trough 25 can be connected with one another as firm as possible, to avoid magnetic field fluctuations due to changes of the relative position of these components relative to one another, for example during vibrations of the harvester 1, etc.

For this purpose clamps 23 are provided, to hold the coils $21_1, \ldots, 21_8$ with the magnet arrangement 19 and the pole shoes 20 on them, on the magnet trough 25. Moreover, the whole structure can be cast in a casting mass 24 to protect them from damages in a rough harvesting operation. The magnet trough 25 is arranged on a rigid supporting axle 11 inside the lower feed roller 10. The accurate location and position is illustrated in FIGS. 4 and 5.

The signal evaluation of the individual signals S of the coils $21_1, \ldots, 21_8$ of the sensor arrangement 21 is performed in a signal evaluating device 30. It can be arranged directly in the metal detecting device 18, for example on a plate 22 arranged between the lower part of the pole shoe 20 and the coils of the sensor arrangement 21, as shown in FIG. 3. It can be however located also outside of the metal detecting device 18, for example in a processor of a control device of the machine 1. Basically it is also possible to accommodate parts of the signal evaluating device 30, for example a pre-amplifier, etc. on the plate 22 in the metal detecting device 18 and further parts of the evaluating device 30 externally in a special device inside the harvester 1, in particular in the center of the control device of the machine 1.

For a faulty triggering of the metal detection device 18, for example by the movement of the roller casing or by simultaneously occurring magnetic field changes produced by the earth magnetic field and dealing with the total width of the feeding, the individual coils $21_1, \ldots, 21_8$, of the sensor device 21 are formed as double coils as shown in FIG. 2. Each two windings of the neighboring coils $21_1, \ldots 21_8$ are switched in opposite directions with the inputs of the common differential amplifier 31. In the edge coils $21_1, \ldots, 21_8$, only a corresponding one winding is used.

This circuitry leads to the situation that interferences which deal with all coils $21_1, \ldots, 21_8$, such as for example a uniform magnetic field change over the total width of the header aggregate are registered with identical intensity in all coils $21_1, \ldots, 21_8$. The induced currents are picked up then with the differential amplification with opposite sides, so that such events can not be registered. If a magnetic field change occurs to the contrary only in a part of the individual detection regions a, . . . , g, this leads to the situation that only in a part of the coils $21_1, \ldots, 21_8$ a current is induced, wherein in some of the neighboring coils $21_1, \ldots, 21_8$ differently intense currents are induced. Thereby the differential signals is produced, which is amplified in the amplifiers 31.

The output signals AS of the amplifier 31 are further supplied to an analog/digital convertor 32, in which a threshold value is adjustable. Only when the analog input signal AS exceeds the adjustable threshold, at the output of the analog/digital convertor 32 a digital output signal DS is outputted, which is then transmitted to an evaluation processor 33. The latter at the output side outputs a stopping signal SS to a corresponding quick stop circuit 34 of the machine, when a digital input signal DS occurs on an input connected with the analog-/digital convertor 32. The quick stop circuit 34 serves for a corresponding stopping of the conveying device 6 or the whole harvester 1.

A problem with a conventional metal detector device occurs when in the detection regions a, . . . , g in a part of the coils $21_1, \ldots, 21_8$ a magnetic field change takes place, which is caused by external influences, for example not by metal parts in the crop G. In this case a faulty triggering of the metal detecting device occurs. A typical interference event can be, for example, a driving through an external magnetic field which is superposed on the measuring magnetic field, but acts only on a part of the individual coils $21_1, \ldots, 21_8$ of the sensor device 21. Such an interference event also can take place during traveling over a pothole, so that on one side the conveying device 6 moves in a jerk-like way. Such a strong acceleration of the coils $21_1, \ldots, 21_8$, of the sensor device 21 in the earth magnetic field also leads to the situation that in the coils $21_1, \ldots, 21_8$, differently intense currents are induced, which as a whole can lead to a faulty triggering.

For avoiding such faulty triggerings, the conveyor 6 in accordance with the present invention has an additional interference sensor device 26. It registers especially such interference events which can lead to magnetic changes caused not by metal parts in the crop G and registered by the sensor device 21, and then produce a faulty triggering warning signal F. This faulty triggering warning signal F is for example transmitted to the evaluating processor 33 shown in FIG. 2, and leads to the situation that the output of a stopping signal S in a certain subsequent time period to the quick stopping circuit 34 is suppressed. Alternatively, this faulty triggering signal F can be outputted directly to the analog-/digital convertor 32, for setting there the adjustable threshold, so that the signal evaluating device 30 and thereby the total metal detecting device 18 is insensitive. For example, it is provided so that after a predetermined time interval of only a few seconds, the adjustable threshold is automatically lowered.

The exact construction and the position of the interference sensor device 26 is shown in FIGS. 3, 4 and 5.

FIG. 4 shows an axial view of the arrangement of the magnet trough 25 with the magnet arrangement 19, the pole shoes 20, the sensor arrangement 21, etc. inside the lower front feed roller 10 of the conveyor, and FIG. 5 is a view of the arrangement from the front as considered in the conveying direction.

As can be seen from FIG. 5, the feed roller 10 is composed of two end-side disc-shaped roller flanges 12a, 12b. On the first roller flange 12a located at the left in FIG. 5, an outwardly extending shaft 15 is mounted. It is supported rotatably in the machine and serves as a driving shaft. The second roller flange 12b is supported through a bearing 16 on a rigid axle 11 that extends toward the total roller 10 and at the end side is supported rotatably in a recess in the first roller flange 12a connected with the shaft 15. The drive shaft 15 and the rigid axle 11 are arranged coaxially relative to one another. The both roller flanges 12a and 12b are connected with one another through several angular roller profiles 14 that extend parallel to the roller axis 11. The roller profiles 14 are distributed uniformly along the periphery of the roller 10 and form a closed casing surface with a vane-like profiling, to draw the crop G in a desired manner between the roller pairs 7, 10, 8, 9 through the conveyor 6. The exact shape of the profiling can be seen in FIG. 4. The individual conveyor profiles 14 are connected at the end sides by screws 13 with the roller flanges 12a, 12b.

The magnet trough 25 with further components locating in it, such as for example the magnet arrangement 19, the pole shoes 20, and the sensor elements or in other words the coils $21_1, \ldots, 21_8$, is mounted on the rigid axle 11 inside the rotatable feed roller 10. The axle 11 is hollow at least in the region of the bearing 16. In other words, it has an opening which is formed as a through guide 17 for guiding the cable for picking up the signals S of the metal detecting device 18 or the sensor device 21 on the roller 10.

The interference sensor device 26 in the shown embodiment has two interference coils 27 each having a pole shoe 28 in its interior. The interference coils 27 in the shown embodiment are formed similarly to the coils $21_1, \ldots, 21_8$ of the sensor arrangement 21 of the metal detecting device 18. However, the interference coils 27 are each located under the magnet trough 25. Thereby the interference coils 27 are arranged substantially outside the measuring magnetic field M. Moreover, the interference coils 27 are offset relative to the sensor coils $21_1, \ldots, 21_8$ of the sensor device 21 downwardly. The arrangement is here concretely, so that the interference coils 27 are inclined forwardly.

When a magnetic field change due to an external magnetic field occurs, it is registered by the corresponding interference coil 27, in whose detection region the magnetic field changes. A current $21_1, \ldots, 21_8$ is induced as in the coils $21_1, \ldots, 21_8$ at the upper side to the sensor device 21 of the metal detecting device 18. It can be then directly used as a faulty triggering warning signal. It is however possible to supply the signals of the individual interference coils 27 first to an interference evaluating circuit 34 schematically shown in FIG. 5, that first evaluates the interference signals and then outputs in some cases a faulty triggering warning signal F.

In addition, the interference sensor device 27 in the shown embodiment has an acceleration sensor 20 in the central region of the feed roller 10 as shown in FIG. 5. Its output signal is supplied to the interference sensor evaluating device 35. With the special arrangement of the different sensor 27, 29 of the interference sensor device 26, in many cases it is not only determined that an interference event occurs, but also what type of the interference event occurs. When for example a magnetic field change occurs due to a jerky acceleration of the magnetic field sensors 27 of the interference sensor device, for example due to driving through a pothole, this event is measured also by the acceleration sensor 29, so that totally it is clear that this impact event had lead to the magnetic field change. If to the contrary a signal is produced only by one of the magnetic field sensors 27, without reaction by the acceleration sensor 29, it is recognized that additionally external magnetic field occurs. Similarly, by the different magnetic field sensors 27 it is determined whether an interference event is registered in right region or in left region of the feed roller 10 or over the whole width.

The faulty triggering warning signal F can be formed for example so that informations about the corresponding error or the interference event are contained in it. In this case the faulty triggering warning signal F can be used in the evaluating processor 33 of the signal evaluating device 30 to perform a comparison with the signals F outputted by the sensors $21_1, \ldots, 21_8$ of the sensor device 21 of the metal detecting device 18, to increase further the detection safety. In particular, it can be checked whether the output signal S of the sensor device 21 of the metal detecting device 18, which points out to a metal part in the conveying product G, comes from the same region as the faulty triggering warning signal F or in other words whether these both signals are efficiently correlated or accidentally both devices are triggered simultaneously.

The faulty triggering warning signal F can be outputted to the driver in the shown embodiment additionally or alternatively, for example when preventing a faulty stopping signal SS based on time reasons is no longer possible, from the signal evaluating device 30 directly via an acoustic or optical indicating device 5 located in the driver's cabin 4 of the harvester. Based on the outputted faulty triggering warning signal F the driver recognizes that a previously performed quick stop of the harvester 1 is performed due to a faulty triggering of the metal detecting device 18 and can again start the harvester 1 without evaluating and through searching of the drawn crop G.

Finally, it should be also mentioned that the above described concrete embodiment of an inventive conveyor is only an example, which can be modified by a person skilled in the art in different ways, within the spirit of the present invention. In particular, the interference sensor device can be realized also with a single interference sensor or with a significantly higher number of interference sensors. Also, different interference sensors can be used, for example coils with or without integrated pole shoes or just sensors with its own measuring magnetic field, or in other words, as an interference sensor in form of a separate metal detector can be used. Also, Hall sensors can be used for measuring magnetic fields, and also any acceleration and speed measuring devices can be utilized. Furthermore, the concrete position of the individual sensors can be adjusted to corresponding requirements. Since frequently in the region of the roller flanges 12a, 12b faulty triggerings can occur, it is however preferable to position corresponding sensors on these ends of the roller. When only one sensor must be utilized, it is especially advantageous to arrange this sensor on the transmission side (drive side) inside the feed roller 10. Furthermore, the invention is not of course limited to a concrete form of a conveyor. Also, with the use of such a conveyor with several feed rollers, the metal detecting device and/or the interference sensor device can be realized in other forms on the conveyor, in particular in one of the other feed rollers.

It will be understood that each of the elements described above, or two or more together, may also find a useful application in other types of constructions differing from the types described above.

While the invention has been illustrated and described as embodied in conveyor with a metal detecting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A conveyor, comprising a metal detecting device for detecting metal parts in a conveying product; a magnet arrangement for producing a measuring magnetic field through which the conveying product is movable; a sensor device for registration a change of the measuring magnetic field; a signal evaluating device for evaluating a signal outputted by said sensor device in case of a magnetic field change, to recognize a metal part in the conveying product; and an interference sensor device which in case of a registration of an interference event, which leads to a magnetic field change caused not by metal parts in the conveying product and registered by said sensing device, outputs a faulty triggering warning signal.

2. A conveyor as defined in claim 1, wherein said interference sensor device has a magnetic field sensor which is formed and/or arranged so that it registers substantially only such magnetic field changes which are caused not by metal parts in the conveying product.

3. A conveyor as defined in claim 2, wherein said magnetic field sensor a sensor that registers a change of an external magnetic field.

4. A conveyor as defined in claim 3, wherein said magnet arrangement of said metal detecting device is formed so that field lines of the measuring magnetic field produced by said magnet arrangement substantially extend from a first side of said metal detecting device through the passing product, said sensor device of said metal detecting device being arranged in said measuring magnetic field, and said magnetic field sensor of said interference sensor device being arranged at a side of said metal detecting device which faces away from said measuring magnetic field.

5. A conveyor as defined in claim 4, wherein said metal detecting device has a metal wall located at a side of said magnet arrangement facing away from the passing product, said metal wall collecting magnetic field lines of said measuring magnetic field and supplying in direction of said magnet arrangement, said magnetic field sensor of said interference sensor device being arranged at a side of said metal wall which faces away from said magnet arrangement.

6. A conveyor as defined in claim 1, wherein said interference sensor device includes an acceleration sensor.

7. A conveyor as defined in claim 1, wherein said interference sensor device includes a plurality of sensors located in different positions along a direction extending transversely to a product flow direction.

8. A conveyor as defined in claim 1, wherein said signal evaluating device is formed so that with a use of a faulty triggering warning signal received by said interference sensor device, a signal outputted by said sensor arrangement of said metal detecting device is corrected.

9. A conveyor as defined in claim 1, wherein said signal evaluating device is formed so that in a case of receipt of a faulty triggering warning signal said metal detecting device is temporarily deactivated or a sensitivity of said metal detecting device is temporarily reduced.

10. A conveyor as defined in claim 1, wherein said interference sensor device is connected with a signal outputting device for outputting said faulty triggering warning signal to a consumer.

11. A harvesting machine, comprising harvesting means; and a conveyor including a metal detecting device for detecting metal parts in a conveying product, a magnet arrangement for producing a measuring magnetic field through which the conveying product is movable, a sensor device for registration a change of the measuring magnetic field, a signal evaluating device for evaluating a signal outputted by said sensor device in case of a magnetic field change, to recognize a metal part in the conveying product; and an interference sensor device which in case of a registration of an interference event, which leads to a magnetic field change caused not by metal parts in the conveying product and registered by said sensing device, outputs a faulty triggering warning signal.

12. A method of detecting metal parts in a conveyed product, comprising the steps of moving the conveying product through a measuring magnetic field, registering with a sensor arrangement a change of said measuring magnetic field; evaluating a signal outputted by the sensor arrangement in response to a magnetic field change for recognizing a metal part in the conveying product; detecting by an interference sensor device interference events which are caused not by metal parts in the conveying product and measured by the sensor device; and generating a faulty triggering warning signal in response to a registration of an interference event.

13. A method as defined in claim 12; and further comprising registering as the interference event by a magnetic field sensor of the interference sensor device such magnetic field changes which are caused not by metal parts in the conveying product.

14. A method as defined in claim 12; and further comprising registering as the interference event, acceleration forces acting on the sensor arrangement.

15. A method as defined in claim 12; and further comprising correcting a signal outputted from the sensor device of the metal detecting device, with use of the faulty triggering warning signal of the interference sensor device.

16. A method as defined in claim 12; and further comprising deactivating the metal detecting device in case of receipt of a faulty triggering warning signal or temporarily reducing a sensitivity of the metal detecting device.

17. A method as defined in claim 12; and further comprising supplying the faulty triggering warning signal to a consumer.

* * * * *